(12) United States Patent
Morota et al.

(10) Patent No.: US 7,653,417 B2
(45) Date of Patent: Jan. 26, 2010

(54) MOBILE UNIT, CALL ORIGINATION CONTROLLING METHOD, AND CALL TERMINATION CONTROLLING METHOD

(75) Inventors: Satoru Morota, Yokohama (JP); Yasutaka Urakawa, Yokohama (JP); Tatsuya Kato, Yokohama (JP); Kenji Ishii, Yokohama (JP); Masanori Fujita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 519 days.

(21) Appl. No.: 11/331,171

(22) Filed: Jan. 13, 2006

(65) Prior Publication Data

US 2006/0116173 A1    Jun. 1, 2006

Related U.S. Application Data

(62) Division of application No. 10/346,135, filed on Jan. 17, 2003, now Pat. No. 7,336,975.

(30) Foreign Application Priority Data

Jan. 17, 2002  (JP)  ............................. 2002-009021
Jul. 19, 2002  (JP)  ............................. 2002-211665

(51) Int. Cl.
   *H04B 1/38*   (2006.01)
(52) U.S. Cl. ............... 455/565; 455/564; 455/550.1
(58) Field of Classification Search .............. None
   See application file for complete search history.

(56) References Cited

U.S. PATENT DOCUMENTS

| | | | |
|---|---|---|---|
| 5,884,193 A | 3/1999 | Kaplan | |
| 6,067,355 A | 5/2000 | Lim et al. | |
| 6,108,563 A | 8/2000 | Shishino | |
| 6,198,812 B1 | 3/2001 | Weber | |
| 6,253,095 B1 | 6/2001 | Ushida | |
| 6,289,084 B1 * | 9/2001 | Bushnell | 379/67.1 |
| 6,330,310 B1 | 12/2001 | Kurosawa | |
| 6,606,493 B1 | 8/2003 | Chow et al. | |
| 6,654,619 B1 | 11/2003 | Zicker et al. | |
| 6,701,160 B1 | 3/2004 | Pinder et al. | |
| 6,819,933 B1 | 11/2004 | Tirabassi et al. | |
| 6,823,057 B1 * | 11/2004 | Pershan et al. | 379/211.02 |
| 2002/0019246 A1 | 2/2002 | Forte | |
| 2003/0050096 A1 | 3/2003 | Heatley | |
| 2003/0181209 A1 | 9/2003 | Forte | |

(Continued)

FOREIGN PATENT DOCUMENTS

EP    0 843 489 A1    5/1998

(Continued)

*Primary Examiner*—Lester Kincaid
*Assistant Examiner*—Phuoc Doan
(74) *Attorney, Agent, or Firm*—Oblon, Spivak, McClelland, Maier & Neustadt, L.L.P.

(57) ABSTRACT

A mobile unit 10 is provided with a called party number acquiring unit 102 for acquiring a called party number corresponding to a call origination command entered by a user, a number checking unit 103 for checking the called party number acquired by the called party number acquiring unit 102, against every origination-restricted number stored in an origination-restricted number storing unit 112, and an origination restricting unit 104 for restricting origination of a call on the basis of the result of the checking by the number checking unit 103.

3 Claims, 9 Drawing Sheets

U.S. PATENT DOCUMENTS

2003/0220099 A1  11/2003  Hama

FOREIGN PATENT DOCUMENTS

| JP | 2-148950 | 6/1990 |
| JP | 5-244247 | 9/1993 |
| JP | 08-317158 | 11/1996 |
| JP | 11-239212 | 8/1999 |
| JP | 2000-32116 | 1/2000 |
| JP | 2000-49687 | 2/2000 |
| JP | 2001-24775 | 1/2001 |
| JP | 2001-127907 | 5/2001 |
| JP | 2003-348219 | 5/2003 |
| JP | 2004-129118 | 4/2004 |
| WO | WO 01/45364 A1 | 6/2001 |

* cited by examiner

| RESTRICTED NUMBER | RESTRICTION | REGISTRATION DATE |
|---|---|---|
| 033—AAA—BBBB | WARNING | JAN 10, 2001 |
| 050—XXX—YYYY | PROHIBITED | FEB 24, 2001 |
| 050—XYZ—YYYY | NO CALLER NUMBER | FEB 24, 2001 |
| ⋮ | ⋮ | ⋮ |

*Fig.3*

| REGISTERED NUMBER | NAMES |
|---|---|
| 033-CCC-DDDD | ○○△△ |
| 045-YYY-ZZZZ | ○△□ |
|  |  |

*Fig.4A*

| CALLER NUMBER | NAMES |
|---|---|
| 033−CCC−DDDD | ○○△△ |
| 045−NNN−MMMM | — |
| ⋮ | ⋮ |

*Fig.4B*

| CALLER NUMBER | NAMES | ATTRIBUTE |
|---|---|---|
| 033−CCC−DDDD | ○○△△ | NORMAL |
| 045−NNN−MMMM | — | RESTRICTED NUMBER |
| ⋮ | ⋮ | ⋮ |

MOBILE UNIT, CALL ORIGINATION CONTROLLING METHOD, AND CALL TERMINATION CONTROLLING METHOD

CROSS-REFERENCE TO RELATED APPLICATIONS

This application is a divisional of U.S. application Ser. No. 10/346,135, filed Jan. 17, 2003, and claims the benefit of priority from the Japanese Patent Application Nos. 2002-211665, filed Jul. 19, 2002, and 2002-009021, filed Jan. 17, 2002, the entire contents of each of which are incorporated herein by reference.

BACKGROUND OF THE INVENTION

1. Field of the Invention

The present invention relates to a mobile unit and a call origination controlling method for controlling call origination of the mobile unit.

2. Description of the Related Art

The mobile units like cellular phones have a received call history recording function of storing calling party numbers corresponding to respective incoming calls on the occasion of receiving incoming calls. A user can know who called, by letting an indication unit like a display indicate the calling party numbers thus stored, and can call back to a calling party number if necessary.

SUMMARY OF THE INVENTION

Nuisance calls misusing the received call history recording function are now flourishing. An example thereof is that there remains a call record of an unknown number in the call history and the user viewing the call record calls back to the number whereupon a recorded guidance to obscene programs starts. This user's calling-back operation does not result in charging an extra fee except for a normal call charge, but, for example, a calling-back operation with notification of an originating party number (i.e. caller number) allows a receiver to know the user's telephone number, which would cause a case of encountering unexpected trouble.

An object of the present invention is, therefore, to provide a mobile unit, a call origination controlling method, and a call termination controlling method capable of reducing the trouble caused by calling-back to call records of unknown numbers.

A mobile unit of the present invention comprises: called party number acquiring means for acquiring a called party number corresponding to a call origination command entered by a user; number checking means for checking the called party number acquired by the called party number acquiring means, against every origination-restricted number stored in origination-restricted number storing means; and origination restricting means for restricting origination of a call on the basis of a result of the checking by the number checking means.

According to the mobile unit of the present invention, each called party number is checked against every origination-restricted number and call origination is restricted on the basis of the result of the checking; therefore, for example, if telephone numbers of malicious content providers are stored as origination-restricted numbers in the origination-restricted number storing means, origination of calls to the malicious content providers can be restricted, which can reduce the trouble caused by the calling-back to the call records of unknown numbers.

The mobile unit of the present invention may be configured so that the origination restricting means orders information outputting means to output warning information on the basis of the result of the checking by the number checking means, and permits origination of the call when the user enters a further call origination command in reply to the warning information outputted on the basis of the order. For example, even if the warning information that the called party number agrees with an origination-restricted number previously stored, is outputted through the information outputting means on the occasion of call origination, there are also cases where the user still desires to make a call after viewing the warning information and judging that the called party number is not an untrustworthy number; therefore, the above configuration improves convenience more while reducing the trouble caused by calling-back to the call records of unknown numbers.

The mobile unit of the present invention may also be configured so that the origination restricting means prohibits origination of the call on the basis of the result of the checking by the number checking means. A called party number is checked against every origination-restricted number and call origination is prohibited on the basis of the result of the checking; therefore, for example, if the telephone numbers of malicious content providers are stored as origination-restricted numbers in the origination-restricted number storing means, origination of calls to the malicious content providers can be prohibited, which can reduce the trouble caused by calling-back to the call records of unknown numbers.

Another mobile unit of the present invention comprises: called party number acquiring means for acquiring a called party number corresponding to a call origination command entered by a user; number checking means for checking the called party number acquired by the called party number acquiring means, against every origination-restricted number stored in origination-restricted number storing means; and origination restricting means for permitting origination of a call without notifying the called party of an originating number on the basis of the result of the checking by the number checking means.

According to the mobile unit of the present invention, each called party number is checked against every origination-restricted number and origination of a call without notification of an originating number is permitted on the basis of the result of the checking; therefore, for example, if the telephone numbers of malicious content providers are stored as origination-restricted numbers in the origination-restricted number storing means, origination of calls to such malicious content providers will be performed without notification of the originating number, which can reduce the trouble caused by calling-back to the call records of unknown numbers.

The mobile unit of the present invention may be configured to further comprise restricted number updating means for acquiring every origination-restricted number to be stored in the origination-restricted number storing means, through an information communication network and for storing every origination-restricted number thus acquired, in the origination-restricted number storing means. Since the origination-restricted numbers are acquired through the information communication network to be stored in the origination-restricted number storing means, it is feasible to update the origination-restricted numbers.

The mobile unit of the present invention may also be configured to further comprise restricted number updating means for updating every origination-restricted number stored in the origination-restricted number storing means, in accordance with an update command entered by the user. Since the origination-restricted numbers are updated according to an update command from the user, the origination-restricted numbers can be updated on the basis of user's wishes.

Another mobile unit of the present invention comprises: ring counting means for counting the number of rings of an incoming call; and storage restricting means for storing a calling party number corresponding to the incoming call in calling party number storing means when the number of rings counted by the ring counting means is greater than a predetermined number, and for avoiding storing the calling party number corresponding to the incoming call in the calling party number storing means when the number of rings is not more than the predetermined number.

According to the mobile unit of the present invention, a calling party number corresponding to an incoming call whose number of rings is not more than the predetermined number, is not stored in the calling party number storing means; therefore, for example, it is feasible to reduce such acts that a malicious content provider deliberately leaves only its calling party number in the call history.

Still another mobile unit of the present invention can be configured to comprise: ringing time measuring means for measuring a ringing time of an incoming call; and storage restricting means for storing a calling party number corresponding to the incoming call in calling party number storing means when the ringing time measured by the ringing time measuring means is longer than a predetermined time, and for avoiding storing the calling party number corresponding to the incoming call in the calling party number storing means when the ringing time is not longer than the predetermined time.

According to the mobile unit of the present invention, a calling party number corresponding to an incoming call whose ringing time is not longer than the predetermined time, is not stored in the calling party number storing means; therefore, for example, it is feasible to reduce such acts that a malicious content provider deliberately leaves only its calling party number in the call history.

A call origination controlling method of the present invention comprises: a called party number acquiring step wherein called party number acquiring means acquires a called party number corresponding to a call origination command entered by a user of a mobile unit; a number checking step wherein number checking means checks the called party number acquired by the called party number acquiring means, against every origination-restricted number stored in origination-restricted number storing means; and an origination restricting step wherein origination restricting means restricts origination of a call on the basis of a result of the checking by the number checking means.

According to the call origination controlling method of the present invention, the number checking means checks each calling party number against every origination-restricted number in the number checking step and the call origination restricting means restricts call origination on the basis of the result of the checking in the call origination restricting step; therefore, for example, if the telephone numbers of malicious content providers are stored as origination-restricted numbers in the origination-restricted number storing means, origination of calls to the malicious content providers can be restricted, which can reduce the trouble caused by calling-back to the call records of unknown numbers.

The call origination controlling method of the present invention may be configured so that in the origination restricting step the origination restricting means orders information outputting means to output warning information on the basis of the result of the checking by the number checking means, and permits origination of the call when the user enters a further call origination command in reply to the warning information outputted on the basis of the order. For example, even if the warning information that the called party number agrees with an origination-restricted number previously stored, is outputted through the information outputting means on the occasion of call origination, there are also cases where the user still desires to make a call after viewing the warning information and judging that the called party number is not an untrustworthy number; therefore, the above configuration improves convenience more while reducing the trouble caused by calling-back to the call records of unknown numbers.

The call origination controlling method of the present invention may also be configured so that in the origination restricting step the origination restricting means prohibits origination of the call on the basis of the result of the checking by the number checking means. A called party number is checked against every origination-restricted number and call origination is prohibited on the basis of the result of the checking; therefore, for example, if the telephone numbers of malicious content providers are stored as origination-restricted numbers in the origination-restricted number storing means, origination of calls to the malicious content providers can be prohibited, which can reduce the trouble caused by calling-back to the call records of unknown numbers.

Another call origination controlling method of the present invention comprises: a called party number acquiring step wherein called party number acquiring means acquires a called party number corresponding to a call origination command entered by a user; a number checking step wherein number checking means checks the called party number acquired by the called party number acquiring means, against every origination-restricted number stored in origination-restricted number storing means; and an origination restricting step wherein origination restricting means permits origination of a call without notification of an originating number on the basis of the result of the checking by the number checking means.

According to the call origination controlling method of the present invention, the number checking means checks each called party number against every origination-restricted number in the number checking step and the origination restricting means permits origination of a call without notification of the originating number on the basis of the result of the checking in the origination restricting step; therefore, for example, if the telephone numbers of malicious content providers are stored as origination-restricted numbers in the origination-restricted number storing means, origination of calls to such malicious content providers will be performed without notification of the originating number, which can reduce the trouble caused by calling-back to the call records of unknown numbers.

The call origination controlling method of the present invention may also be configured to further comprise a restricted number updating step wherein restricted number updating means acquires every origination-restricted number to be stored in the origination-restricted number storing means, through an information communication network and stores every origination-restricted number thus acquired, in the origination-restricted number storing means. Since the origination-restricted numbers are acquired through the information communication network to be stored in the origination-restricted number storing means, it is feasible to update the origination-restricted numbers.

The call origination controlling method of the present invention may also be configured to further comprise a restricted number updating step wherein restricted number updating means updates every origination-restricted number stored in the origination-restricted number storing means, in accordance with an update command entered by the user. Since the origination-restricted numbers are updated according to an update command from the user, the origination-restricted numbers can be updated on the basis of user's wishes.

A call termination controlling method of the present invention comprises: a ring counting step wherein ring counting means counts the number of rings of an incoming call; and a storage restricting step wherein storage restricting means stores a calling party number corresponding to the incoming call in calling party number storing means when the number of rings counted by the ring counting means is greater than a predetermined number, and avoids storing the calling party number corresponding to the incoming call in the calling party number storing means when the number of rings is not more than the predetermined number.

According to the call termination controlling method of the present invention the storage restricting means avoids storing a calling party number corresponding to an incoming call whose number of rings is not more than the predetermined number, in the storage restricting step; therefore, for example, it is feasible to reduce such acts that a malicious content provider deliberately leaves only its calling party number in the call history. The call termination controlling method of the present invention may also be configured to leave a call record of a number already registered in the telephone directory, regardless of the number of rings, in the call history and count the number of rings for only an unregistered number.

Another call termination controlling method of the present invention can be configured to comprise: a ringing time measuring step wherein ringing time measuring means measures a ringing time of an incoming call; and a storage restricting step wherein storage restricting means stores a calling party number corresponding to the incoming call in calling party number storing means when the ringing time measured by the ringing time measuring means is longer than a predetermined time, and avoids storing the calling party number corresponding to the incoming call in the calling party number storing means when the ringing time is not longer than the predetermined time.

According to the call termination controlling method of the present invention, the storage restricting means avoids storing a calling party number corresponding to an incoming call whose ringing time is not longer than the predetermined time, in the calling party number storing means in the storage restricting step; therefore, it is feasible to reduce such acts that a malicious content provider deliberately leaves only its calling party number in the call history. The call termination controlling method of the present invention may also be configured to leave a call record of a number already registered in the telephone directory, regardless of the ringing time, in the call history and measure the ringing time for only an unregistered number.

According to the present invention, a called party number is checked against every origination-restricted number and the call origination is restricted on the basis of the result of the check; therefore, for example, if the telephone numbers of malicious content providers are stored as origination-restricted numbers in the origination-restricted number storing means, it is feasible to restrict the origination of calls to the malicious content providers and to reduce the trouble caused by calling-back to the call records of unknown numbers. Accordingly, the present invention successfully has provided the mobile unit and call origination controlling method capable of reducing the trouble caused by calling-back to the call records of unknown numbers, which was the object of the present invention.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings, in which.

DESCRIPTION OF THE PREFERRED EMBODIMENTS

The knowledge of the present invention can be readily understood in view of the following detailed description with reference to the accompanying drawings provided only for the illustrative purpose. The following will describe embodiments of the present invention with reference to the accompanying drawings. The same portions will be denoted by the same reference symbols as much as possible, and redundant description will be omitted.

Figure 1:
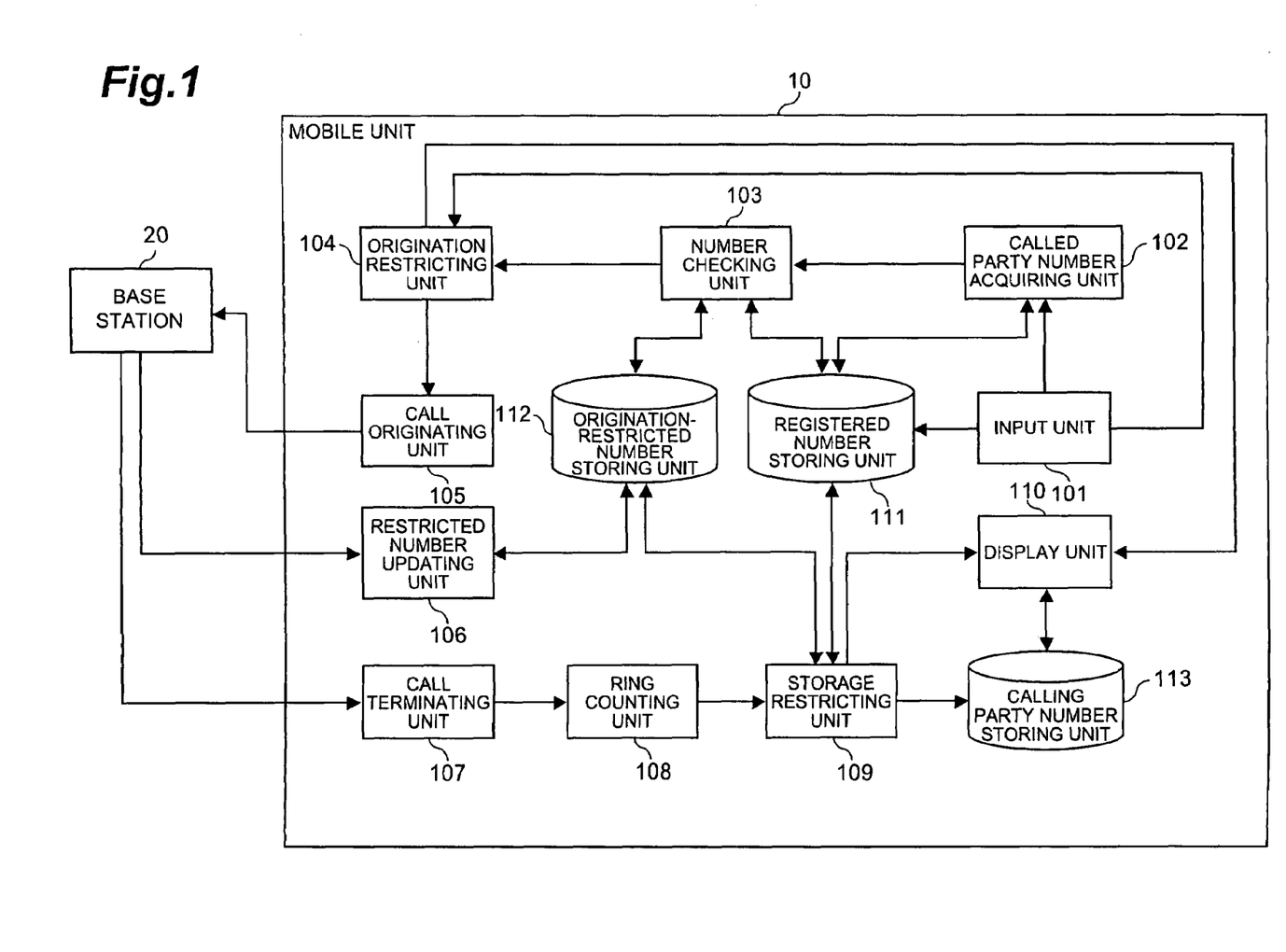
FIG. 1 is a diagram for explaining the mobile unit as an embodiment of the present invention.

The mobile unit 10, which is an embodiment of the present invention, will be described referring to FIG. 1. FIG. 1 is a diagram for explaining the configuration of the mobile unit 10. The mobile unit 10 is configured to be communicable with base station 20 and exchange information through the base station 20 with a mobile communication network.

The mobile unit 10 is, physically, a cellular phone having the data communication function as well and adopts the PDC (Personal Digital Cellular) method, which is one of TDMA (Time Division Multiple Access) systems. The mobile unit 10 may also be a digital cellular phone of another system such as the CDMA (Code Division Multiple Access) system and can also adopt such a system as GPRS (General Packet Radio Service) A variety of data-transmissible systems can be adopted according to needs. Furthermore, it may employ the so-called third-generation mobile communication systems like IMT-2000.

The mobile unit 10 includes such functional components as an input unit 101, a called party number acquiring unit (called party number acquiring means) 102, a number checking unit (number checking means) 103, an origination restricting unit (origination restricting means) 104, a call originating unit 105, a restricted number updating unit (restricted number updating means) 106, a call terminating unit 107, a ring counting unit (ring counting means) 108, a storage restricting unit (storage restricting means) 109, a display unit (information outputting means) 110, a registered number storing unit 111, an origination-restricted number storing unit (origination-restricted number storing means) 112, and a calling party number storing unit (calling party number storing means) 113. The following will detail each of the components.

The input unit 101 is a portion serving as an interface when the user enters information into the mobile unit 10, including input buttons and dials. More specifically, for the user to register telephone numbers in the mobile unit, the user enters such information in the input unit 101 through the input buttons and the input unit 101 stores the input information of the telephone numbers and correspondent party names in the registered number storing unit 111. When the user desires to make a call and enters a call origination command, e.g., a telephone number, the input unit 101 outputs the telephone number as a called party number to the called party number acquiring unit 102. The entry of the telephone number may be done by depressing the numeral buttons of the input buttons at every call origination or by selecting one of preliminarily registered telephone numbers through the use of the input bottoms and dials. Alternatively, the mobile unit is provided with a redial function of storing a corresponding telephone number at every call origination from the mobile unit and the user is allowed to select the telephone number specified by the redial function.

The called party number acquiring unit 102 is a portion which acquires a called party number corresponding to each call origination command entered by the user. More specifically, when the user enters a telephone number by depressing the numeral buttons in the input unit 101, the acquiring unit 102 acquires the telephone number outputted by the input unit 101, as a called party number. When the user selects a telephone number out of those preliminarily registered, using the input buttons and dials, the acquiring unit 102 acquires the telephone number corresponding to a selection command outputted by the input unit 101, as a called party number. The mobile unit also has the redial function of automatically recording a telephone number at every outgoing call, the incoming call history recording function of recording a caller number and other information at every incoming call, and a function of originating a call from a browser, and the acquiring unit 102 also acquires a telephone number as a called party number from those. The called party number acquiring unit 102 outputs the called party number thus acquired, to the number checking unit 103.

The number checking unit 103 is a portion which checks the called party number acquired by the called party number acquiring unit 102, against every origination-restricted number stored in the origination-restricted number storing unit 112. The number checking unit 103 is also a portion which checks the called party number acquired by the called party number acquiring unit 102, against every registered number stored in the registered number storing unit 111. First, the origination-restricted number storing unit 112 and the registered number storing unit 111 will be described below.

Figure 2:
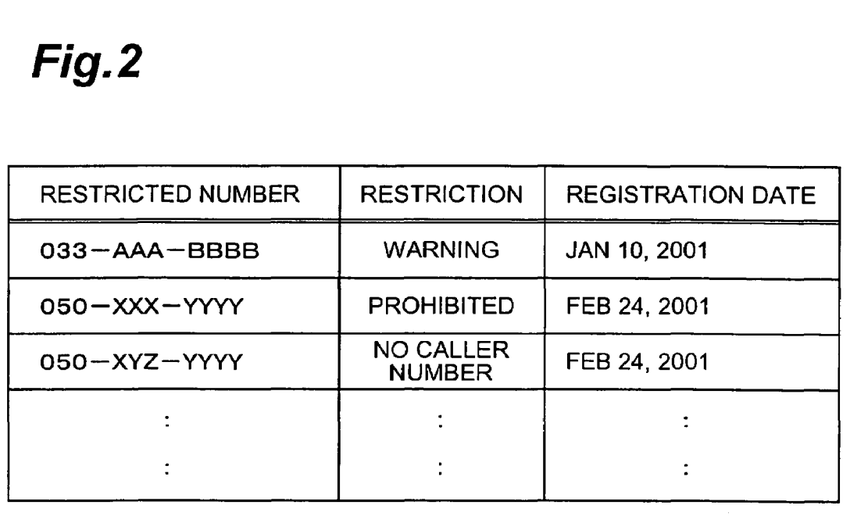
FIG. 2 is a diagram showing an example of information stored in the origination-restricted number storing unit in FIG. 1.

FIG. 2 shows an example of information stored in the origination-restricted number storing unit 112. In the example of FIG. 2, the origination-restricted number storing unit 112 stores origination-restricted numbers, restriction contents corresponding to the respective origination-restricted numbers, and registration dates when the origination-restricted numbers were registered, in correspondence with each other. Each origination-restricted number is a suspicious telephone number like a telephone number of a malicious content provider and number with which origination of a call should be restricted or prohibited on the occasion of call origination to the telephone number. In the case of the present embodiment the restriction contents are classified under three types, "warning," "prohibited," and "no caller number." With "warning," a warning is issued to the user and call origination thereafter is performed only if the user still desires to make a call. With "prohibited," a process of originating no call is performed regardless of user's wishes. With the restriction "no caller number," the mobile unit performs a process of originating a call without notifying the called party of the caller number of the mobile unit 10. The information stored in the origination-restricted number storing unit 112 may be transmitted to another mobile unit by infrared communication specified by IrDA (Infrared Data Association) or by a mail function.

Figure 3:
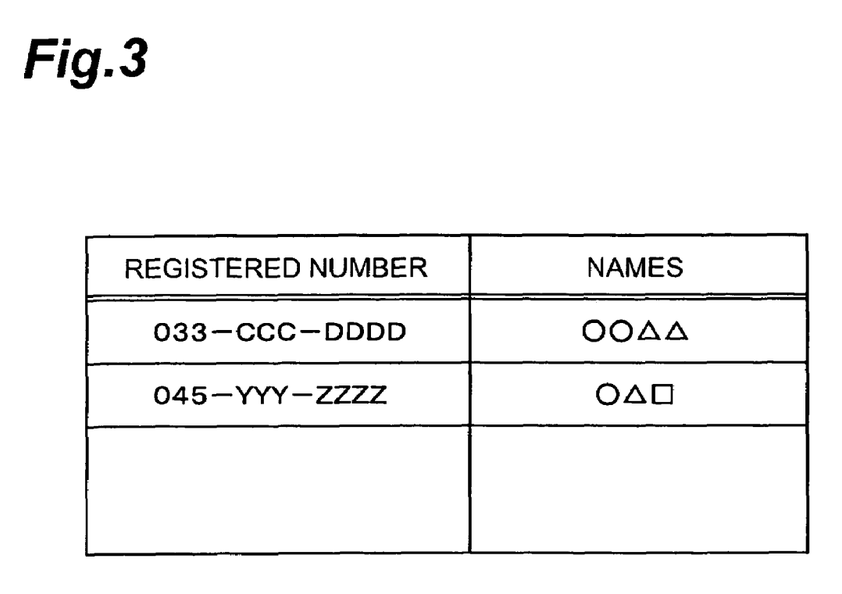
FIG. 3 is a diagram showing an example of information stored in the registered number storing unit in FIG. 1.

FIG. 3 shows an example of information stored in the registered number storing unit 111. In the example of FIG. 3, the registered number storing unit 111 stores registered numbers and designations like real names corresponding to the registered numbers. Each registered number is a number like a called party's telephone number to which the user using the mobile unit 10 frequently makes calls, and such information as an address of the called party may also be stored in correspondence therewith.

When a called party number acquired by the called party number acquiring unit 102 agrees with a registered number stored in the registered number storing unit 111, the number checking unit 103 determines that the called party number is not a suspicious telephone number, and outputs the result of the determination along with the called party number to the origination restricting unit 104. For example, when the called party number is "033-CCC-DDDD," it can be determined that the called party number is the telephone number with the name of "○○ΔΔ," and thus the number checking unit 103 outputs information to order execution of a normal call origination process, together with the called party number "033-CCC-DDDD," to the origination restricting unit 104.

When a called party number acquired by the called party number acquiring unit 102 agrees with an origination-restricted number stored in the origination-restricted number storing unit 112, the number checking unit 103 determines that the called party number is a suspicious telephone number, and outputs the result of the determination along with the called party number to the origination restricting unit 104. For example, when the called party number is "033-AAA-BBBB," the number checking unit 103 can determine that the restriction is "warning," and thus the number checking unit 103 outputs the information to order execution of a call origination process after warning the user, together with the called party number "033-AAA-BBBB," to the origination restricting unit 104.

The origination restricting unit 104 is a portion which restricts call origination on the basis of the result of the checking on the called party number by the number checking unit 103. More specifically, when the number checking unit 103 checks the called party number against the registered numbers stored in the registered number storing unit 111 and if the called party number agrees with a registered number, the origination restricting unit 104 outputs information to order execution of the normal call origination process along with the called party number to the call originating unit 105. On the other hand, when the number checking unit 103 checks the called party number against the origination-restricted numbers stored in the origination-restricted number storing unit 112 and if the called party number agrees with an origination-restricted number, the origination restricting unit 104 performs a restricted call origination process.

In the example of FIG. 2, when the called party number is "033-AAA-BBBB," the restriction is "warning," and thus the origination restricting unit 104 outputs instruction information to order the display unit 110 to display an indication "The called party can be inappropriate. Do you still want to make a call? "Yes" or "No"." If the user of the mobile unit 10 viewing the display selects "Yes," the input unit 101 outputs the selected information to the origination restricting unit 104. The origination restricting unit 104 outputs instruction information to order the call originating unit 105 to originate the call to "033-AAA-BBBB" in accordance with the output from the input unit 101.

When the called party number is "050-XXX-YYYY," the restriction is "prohibited," and thus the origination restricting unit 104 outputs no instruction information for call origination to the call originating unit 105. The origination restricting unit 104 may be configured to output instruction information to instruct the display unit 110 to display an indication "The called party can be inappropriate and no call is originated." on this occasion. Furthermore, when the called party number is "050-XYZ-YYYY," the restriction is "no caller number," and thus the origination restricting unit 104 outputs instruction information to instruct the call originating unit 105 to originate a call without notification of the caller number of the mobile unit 10 to "050-XYZ-YYYY."

The display unit 110 is a portion for displaying character information and/or image information like a liquid crystal display. The call originating unit 105 is a portion for carrying out the call origination process to the base station 20 on the basis of instruction information from the origination restricting unit 104.

The restricted number updating unit 106 is a portion which acquires origination-restricted numbers to be stored in the origination-restricted number storing unit 112, through an information communication network and which stores the origination-restricted numbers thus acquired, in the origination-restricted number storing unit 112. More specifically, the restricted number updating unit 106 acquires through the base station 20 the origination-restricted numbers transmitted from an origination-restricted number management server (not shown) included in the information communication network, together with such information as registration dates, and stores the origination-restricted numbers and registration dates thus acquired, in the origination-restricted number storing unit 112. If an origination-restricted number thus acquired is one previously stored in the origination-restricted number storing unit 112, the restricted number updating unit 106 writes the information over a corresponding area to update the information. The information transmitted with the origination-restricted number can include such information as an expiration date, in addition to the registration date, in certain cases. The restricted number updating unit 106 also functions to delete an origination-restricted number whose expiration date has passed. For example, supposing the expiration date is set to be a half year since a registration date, the restricted number updating unit 106 deletes the information about the origination-restricted number of "033-AAA-BBBB" on Jul. 10, 2001 after a half year has passed since Jan. 10, 2001 of its registration date.

Furthermore, the restricted number updating unit 106 may also be configured to update the origination-restricted numbers in accordance with an update command entered by the user. The restricted number updating unit 106 may also be configured so that, when an origination-restricted number stored in the origination-restricted number storing unit 112 is not one transmitted from the origination-restricted number management server (not shown), the updating unit 106 transmits the origination-restricted number to the origination-restricted number management server (not shown). This configuration permits each user to register suspicious telephone numbers found thereby in the origination-restricted number management server (not shown). The restricted number updating unit 106 may be arranged to automatically transmit the origination-restricted numbers or transmit them on the basis of a command from the user, to the origination-restricted number management server (not shown).

The origination-restricted number management server (not shown) may be configured so that, when it receives an origination-restricted number transmitted from the restricted number updating unit 106 and when the same telephone number is received from a specific number of users or from users over a fixed number, the server transmits the telephone number as an origination-restricted number to other mobile units (not shown). The origination-restricted number management server (not shown) may also be configured so that, when it receives an origination-restricted number transmitted from a mobile unit of a highly reliable user preliminarily registered, the server transmits the telephone number thus received, as an origination-restricted number to other mobile units (not shown) The origination-restricted number management server (not shown) may also be configured to store the origination-restricted numbers transmitted to each mobile unit as described above, in the form of a data list and, in that case, the server may also be configured to add a telephone number that should be disclosed as an origination-restricted number for an appropriate reason, as described previously, to the data list.

The call terminating unit 107 is a portion which performs a call termination process from the base station 20. More specifically, it is a portion performing a process of acquiring a calling party number transmitted from the base station 20 and outputting a call start and a call end of the incoming call to the ring counting unit 108, in addition to the normal call termination process.

The ring counting unit 108 is a portion which counts the number of rings corresponding to each incoming call and which outputs the number of rings along with the calling party number to the storage restricting unit 109.

The storage restricting unit 109 is a portion which is so configured that, when the number of rings counted by the ring counting unit 108 is greater than a predetermined number, the storage restricting unit 109 stores a calling party number corresponding to an incoming call in the calling party number storing unit 113 and that, when the number of rings is not more than the predetermined number, the storage restricting unit 109 avoids storing a calling party number corresponding to an incoming call in the calling party number storing unit 113. For example, supposing the predetermined number is set as one, the storage restricting unit 109 avoids storing a calling party number corresponding to an incoming call whose number of rings is one, in the calling party number storing unit 113, but it stores a calling party number corresponding to an incoming call whose number of rings is two or more, in the calling party number storing unit 113. The storage restricting unit 109 may also be so configured that, when a calling party number agrees with an origination-restricted number, it avoids storing the calling party number in the calling party number storing unit 113. Instead of the process of avoiding storing the calling party number in the calling party number storing unit 113, the storage restricting unit 109 may also be configured to store the calling party number with such attendant information as the number of rings in a storage area different from that for normal calling party numbers. Furthermore, the storage restricting unit 109 may be configured to store the calling party number as an origination-restricted number in the origination-restricted number storing unit 112. Cases where the storage restricting unit 109 determines that the calling party number is an origination-restricted number, include a case where the number of rings is not more than the predetermined number, a case where the user judges an incoming call as abnormal ringing and gives a command to store its calling party number as an origination-restricted number, and soon.

Figure 4A:
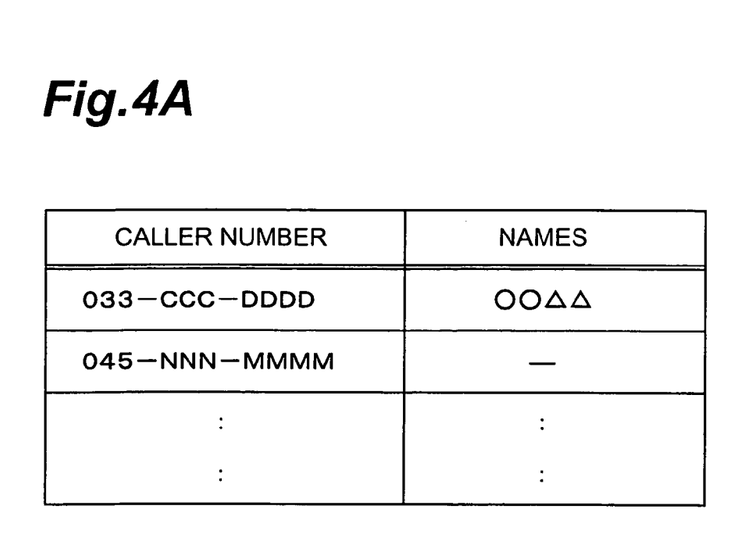
FIG. 4 is a diagram showing examples of information stored in the calling party number storing unit in FIG. 1.
Figure 4B:
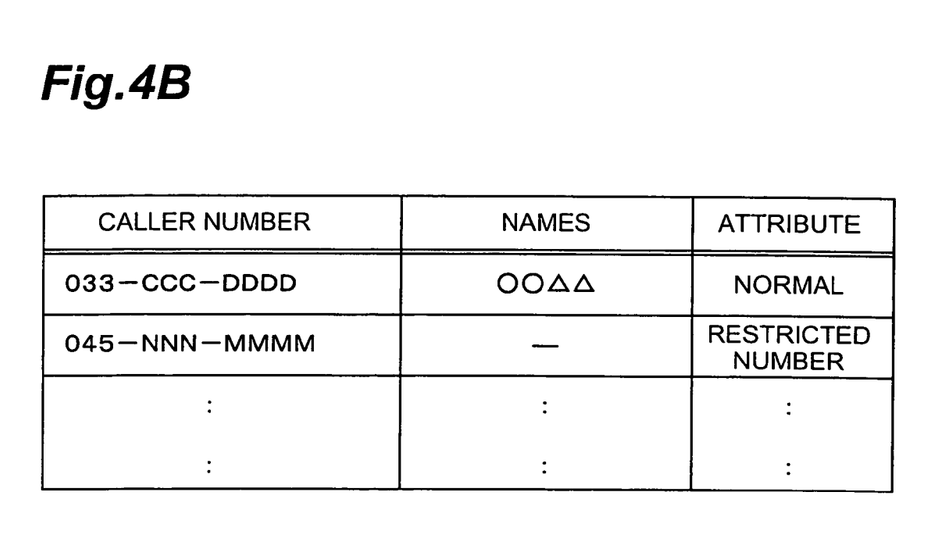

The calling party number storing unit 113 is a portion which stores calling party numbers and names corresponding to the calling party numbers in correspondence with each other, as shown in FIG. 4(*a*). In the designation column, where a calling party number agrees with a registered number stored in the registered number storing unit 111, a name corresponding to the registered number is stored. The calling party number storing unit 113 may also be configured to store an attribute corresponding to each calling party number together with the calling party number and name corresponding thereto, as shown in FIG. 4(*b*). This attribute is displayed on the display unit 110 so as to permit the user to view it, so that the user can determine which calling party number is normal and which calling party number is suspicious.

Figure 5:
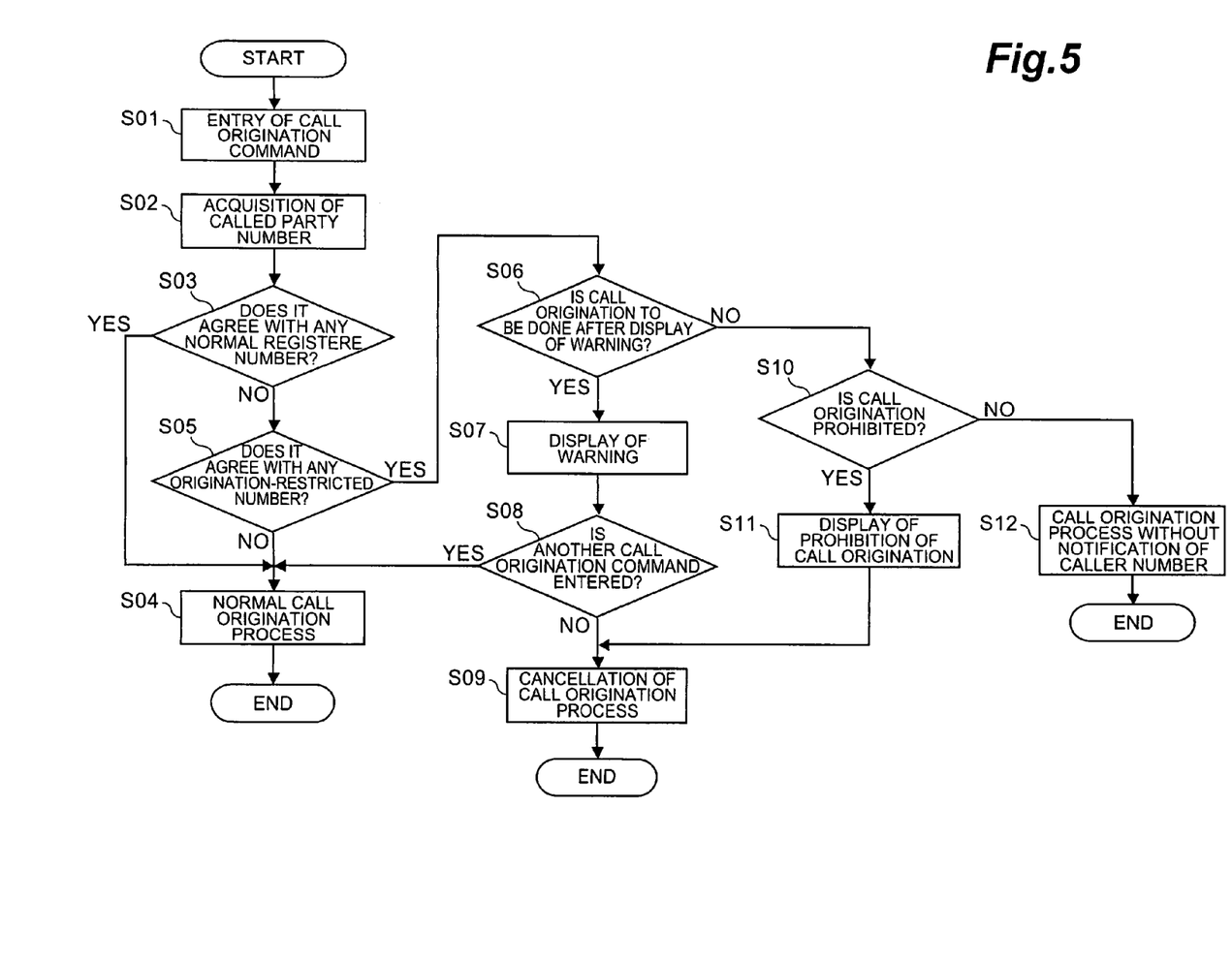
FIG. 5 is a flowchart showing a method of originating a call, using the mobile unit as an embodiment of the present invention.

Subsequently, a method of performing call origination by means of the mobile unit 10 will be described below with reference to FIG. 5. In the first step the user enters a call origination command including information to specify a telephone number of a party to be called, in the input unit 101 of the mobile unit 10 (step S01). The call origination command thus entered is outputted from the input unit 101 to the called party number acquiring unit 102.

The called party number acquiring unit 102 acquires the called party number corresponding to the call origination command outputted from the input unit 101 (step S02). When in the step S01 the user enters the telephone number by depressing the numeral buttons in the input unit 101, the called party number acquiring unit 102 acquires the telephone number outputted from the input unit 101, as a called party number. When in the step S01 the user selects the called party number out of those preliminarily registered thereby, those recorded in the redial function, and those specified by the call history, through the use of the input buttons and dials, the called party number acquiring unit 102 acquires the telephone number corresponding to the selection command outputted from the input unit 101, as a called party number. The called party number acquiring unit 102 outputs the called party number thus acquired, to the number checking unit 103.

The number checking unit 103 determines whether the called party number agrees with any registered number stored in the registered number storing unit 111 (step S03). When the called party number acquired by the called party number acquiring unit 102 agrees with a registered number stored in the registered number storing unit 111, the number checking unit 103 determines that the called party number is not a suspicious telephone number, and outputs the result of the determination with the called party number to the origination restricting unit 104. For example, where the called party number is "033-CCC-DDDD," the number checking unit can determine that the called party number is the telephone number with the name of "○○△△," and thus outputs the information to order execution of the normal call origination process, with the called party number "033-CCC-DDDD" to the origination restricting unit 104. The origination restricting unit 104 outputs the instruction information to instruct the call originating unit 105 to perform the normal call origination process, and the call originating unit 105 performs the normal call origination process on the basis of the instruction information (step S04).

When in the step S03 the called party number does not agree with any registered number, the number checking unit 103 determines whether the called party number acquired by the called party number acquiring unit 102 agrees with any origination-restricted number stored in the origination-restricted number storing unit 112 (step S05). When the called party number does not agree with any origination-restricted number, the number checking unit 103 determines that the called party number is not a suspicious telephone number, and outputs the result of the determination with the called party number to the origination restricting unit 104, followed by the process in step S04.

When the called party number agrees with an origination-restricted number on the other hand, the number checking unit 103 determines that the called party number is a suspicious telephone number, and outputs the result of the determination with the called party number and the restriction content to the origination restricting unit 104. The origination restricting unit 104 determines whether the restriction content is "warning" (step S06). When the restriction content is "warning," the origination restricting unit 104 outputs the instruction information to instruct the display unit 110 to display a warning, and the display unit 110 displays the warning (step S07).

After the display unit 110 displays the warning, the origination restricting unit 104 goes into a standby state in which input of a call origination command is awaited (step S08). When the user enters a call origination command in the input unit 101, the call origination command is outputted to the origination restricting unit 104 and the process in the step S04 is carried out. On the other hand, when the user does not input a call origination command in the input unit 101, the origination restricting unit 104 cancels the call origination process (step S09).

When it is determined in the step S06 that the restriction content is not "warning," the origination restricting unit 104 determines whether the restriction content is "prohibited" (step S10). When the restriction content is "prohibited," the origination restricting unit 104 outputs instruction information to instruct the display unit 110 to provide display of the fact, and the display unit 110 displays an indication of call prohibited (step S11). After the display unit 110 displays the indication of call prohibited, the process in step S09 is carried out.

When the restriction content is not "prohibited" in step S10, the origination restricting unit 104 determines that the restriction content is "no caller number," it outputs a call origination command to order execution of the call origination process no caller number of the caller number, to the call originating unit 105. The call originating unit 105 performs the call origination process without notification of the calling party number in accordance with the call origination command (step S12).

Figure 6:
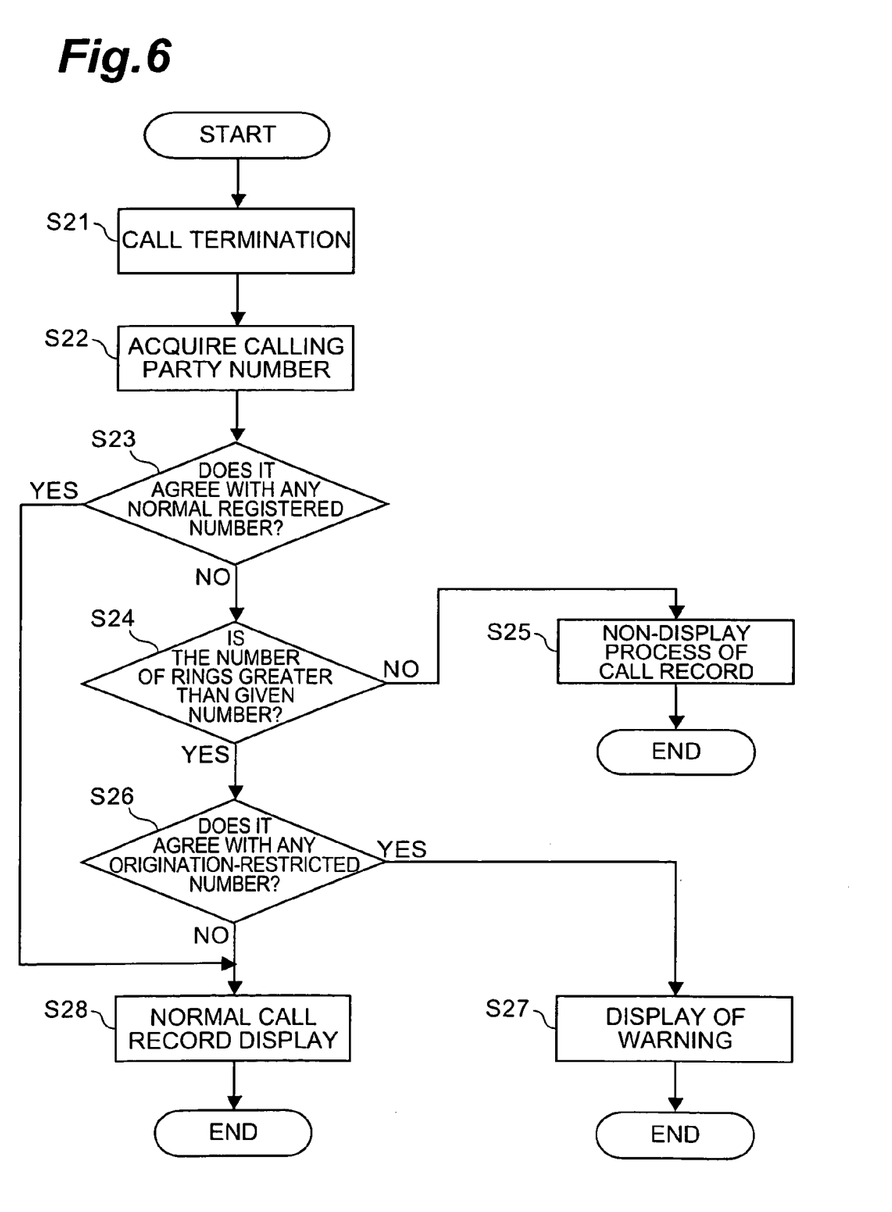
FIG. 6 is a flowchart showing a method of displaying the call history, using the mobile unit as an embodiment of the present invention.

Subsequently, a method of storing a call record with an incoming call to the mobile unit 10 will be described below referring to FIG. 6. When a third party tries originating a call to the mobile unit 10, call termination information is transmitted from the base station 20 to the mobile unit 10 (step S21).

When the call terminating unit 107 of the mobile unit 10 receives the call termination information, the call terminating unit 107 acquires a calling party number and outputs it to the ring counting unit 108. The ring counting unit 108 counts the number of rings corresponding to the incoming call and outputs the counted number with the calling party number to the storage restricting unit 109 (step S22).

The storage restricting unit 109 determines whether the calling party number agrees with any normal registered number stored in the registered number storing unit 111 (step S23).

When in the step S23 the calling party number does not agree with any normal registered number, the storage restricting unit 109 determines whether the number of rings is greater than the predetermined number (step S24). When the number of rings is not more than the predetermined number (e.g., one), the storage restricting unit 109 performs a non-display process of the call record, for example, by discarding the calling party number corresponding to the incoming call (step S25).

When in the step S24 the number of rings is greater than the predetermined number (e.g., one), the storage restricting unit 109 determines whether the calling party number agrees with any origination-restricted number stored in the origination-restricted number storing unit 112 (step S26).

When in the step S26 the calling party number agrees with an origination-restricted number, the storage restricting unit 109 outputs information to order display of the warning, to the display unit 110, and the display unit 110 displays the warning (step S27).

When in the step S23 the calling party number agrees with a registered number or when in the step S26 the calling party number does not agree with any origination-restricted number, the storage restricting unit 109 performs a process of storing the information about the calling party number in the calling party number storing unit 113 and performing the normal call record displaying operation (step S28).

Figure 7:
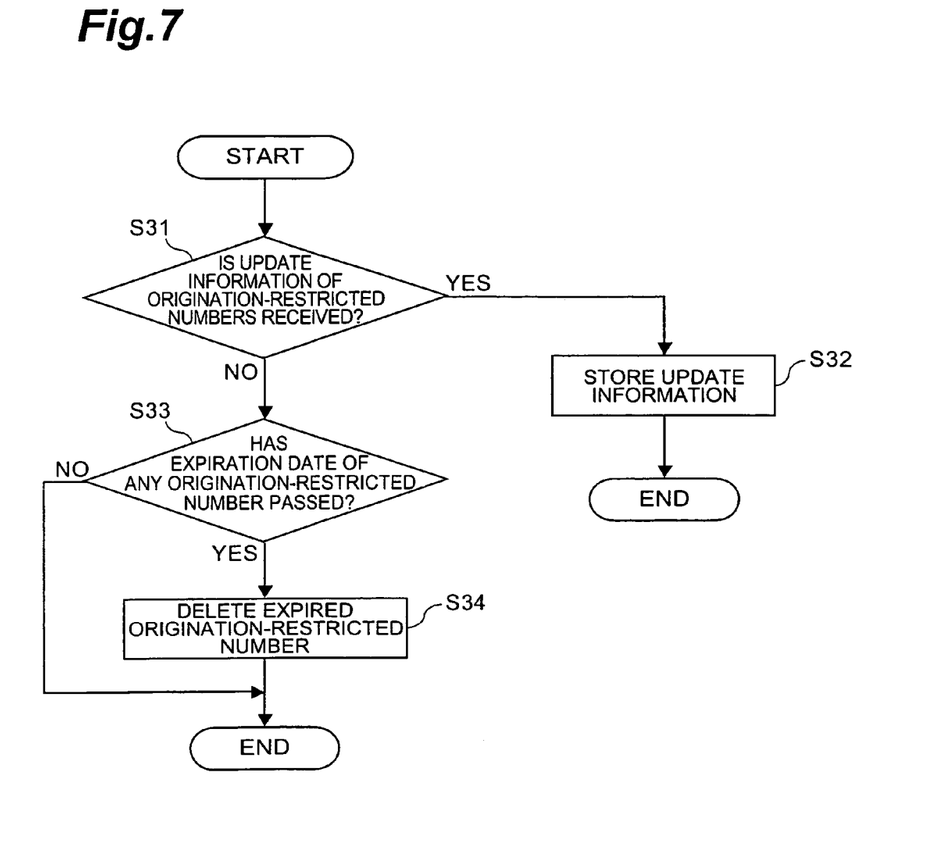
FIG. 7 is a flowchart showing a method of updating the origination-restricted numbers, using the mobile unit as an embodiment of the present invention.

Subsequently, a method of updating the origination-restricted numbers stored in the origination-restricted number storing unit 112 of the mobile unit 10 will be described below referring to FIG. 7. The restricted number updating unit 106 of the mobile unit 10 is in a standby state in which it awaits reception of update information of origination-restricted numbers (step S31).

When the restricted number updating unit 106 receives update information of origination-restricted numbers, it stores the update information thus received, in the origination-restricted number storing unit 112 (step S32).

When the restricted number updating unit 106 does not receive any update information of origination-restricted numbers, it checks whether the expiration date of any origination-restricted number stored in the origination-restricted number storing unit 112 has passed (step S33).

If the expiration date of an origination-restricted number stored in the origination-restricted number storing unit 112 has passed, the restricted number updating unit 106 performs a process of deleting the origination-restricted number (step S34).

The operation and effect of the present embodiment will be described. The number checking unit 103 of the mobile unit 10 checks a called party number against the origination-restricted numbers and the origination restricting unit 104 restricts call origination on the basis of the result of the check; therefore, if the telephone numbers of malicious content providers are stored as origination-restricted numbers in the origination-restricted number storing unit 112, it is feasible to restrict the origination of calls to the malicious content providers and to reduce the trouble caused by calling-back to the call records of unknown numbers.

Even if at the time of call origination the display unit 110 provides output of the warning information that the called party number agrees with an origination-restricted number preliminarily stored and if the user views the warning information and determines that the called party number is not an untrustworthy number, the call origination will be permitted, which improves convenience more while reducing the trouble caused by calling-back to the call records of unknown numbers.

Since the origination restricting unit 104 of the mobile unit 10 prohibits the call origination on the basis of the result of the check by the number checking unit 103, if the telephone numbers of malicious content providers are stored as origination-restricted numbers in the origination-restricted number storing unit 112, it is feasible to prohibit the origination of calls to the malicious content providers and to reduce the trouble caused by calling-back to the call records of unknown numbers.

Since the mobile unit is constructed in the configuration wherein the number checking unit 103 checks a called party number against the origination-restricted numbers and wherein the origination restricting unit 104 permits the origination of a call without notification of the originating number on the basis of the result of the check, if the telephone numbers of malicious content providers are stored as origination-restricted numbers in the origination-restricted number storing unit 112, the call origination will be permitted without notification of the originating number to such malicious content providers, which can reduce the trouble caused by calling-back to the call records of unknown numbers.

Since the mobile unit is provided with the restricted number updating means for acquiring the origination-restricted numbers to be stored in the origination-restricted number storing unit 112, through the information communication network and for storing the origination-restricted numbers thus acquired, in the origination-restricted number storing unit 112, it is feasible to update the origination-restricted numbers.

Since the storage restricting unit 109 avoids storing a calling party number corresponding to an incoming call with the number of rings not more than the predetermined number, in the calling party number storing unit 113, it is feasible, for example, to reduce such acts that the malicious content providers deliberately leave only their calling party numbers in the call history.

In the above embodiment, the storage restricting unit 109 was configured to store a calling party number corresponding to an incoming call the number of rings of which was greater than the predetermined number, in the calling party number storing unit 113 but avoid storing a calling party number corresponding to an incoming call the number of rings of which was not more than the predetermined number, in the calling party number storing unit 113. In addition, the storage restricting unit 109 can be provided with an additional termination notification controlling function as described below.

Namely, the storage controlling unit 109 does not output any termination notification command to a termination notification unit not shown, while the number of rings is not more than the predetermined number. On the other hand, it outputs a termination notification command to the termination notification unit when the number of rings exceeds the predetermined number. The termination notification unit herein is a portion performing a termination notification process for notifying the user of the mobile unit 10, of an incoming call, and the termination notification command is a signal serving as a trigger for letting the termination notification unit start the termination notification process. The above termination notification process can be selected from various processes including sound of ring tone, activation of a vibrator, blink of a light, a text indication of "incoming call" on a display, and so on.

By adding this termination notification controlling function, it is feasible to prevent the termination notification process from being activated against every call termination the number of rings of which is not more than the predetermined number. As a result, the user of the mobile unit 10 is liberated from botheration such as the termination process, the termination canceling process, and so on.

The above termination notification control may be arranged to be executed for all incoming calls or to be executed for only incoming calls from calling party numbers not stored in the registered number storing unit 111 (unregistered originating numbers).

The above embodiment was so configured that the ring counting unit 108 counted the number of rings corresponding to each incoming call and that the storage restricting unit 109 stored a calling party number corresponding to an incoming call in the calling party number storing unit 113 when the number of rings thereof was greater than the predetermined number, and avoided storing a calling party number corresponding to an incoming call in the calling party number storing unit 113 when the number of rings thereof was not more than the predetermined number, but it is also possible to employ a modification example as described below.

Figure 8:
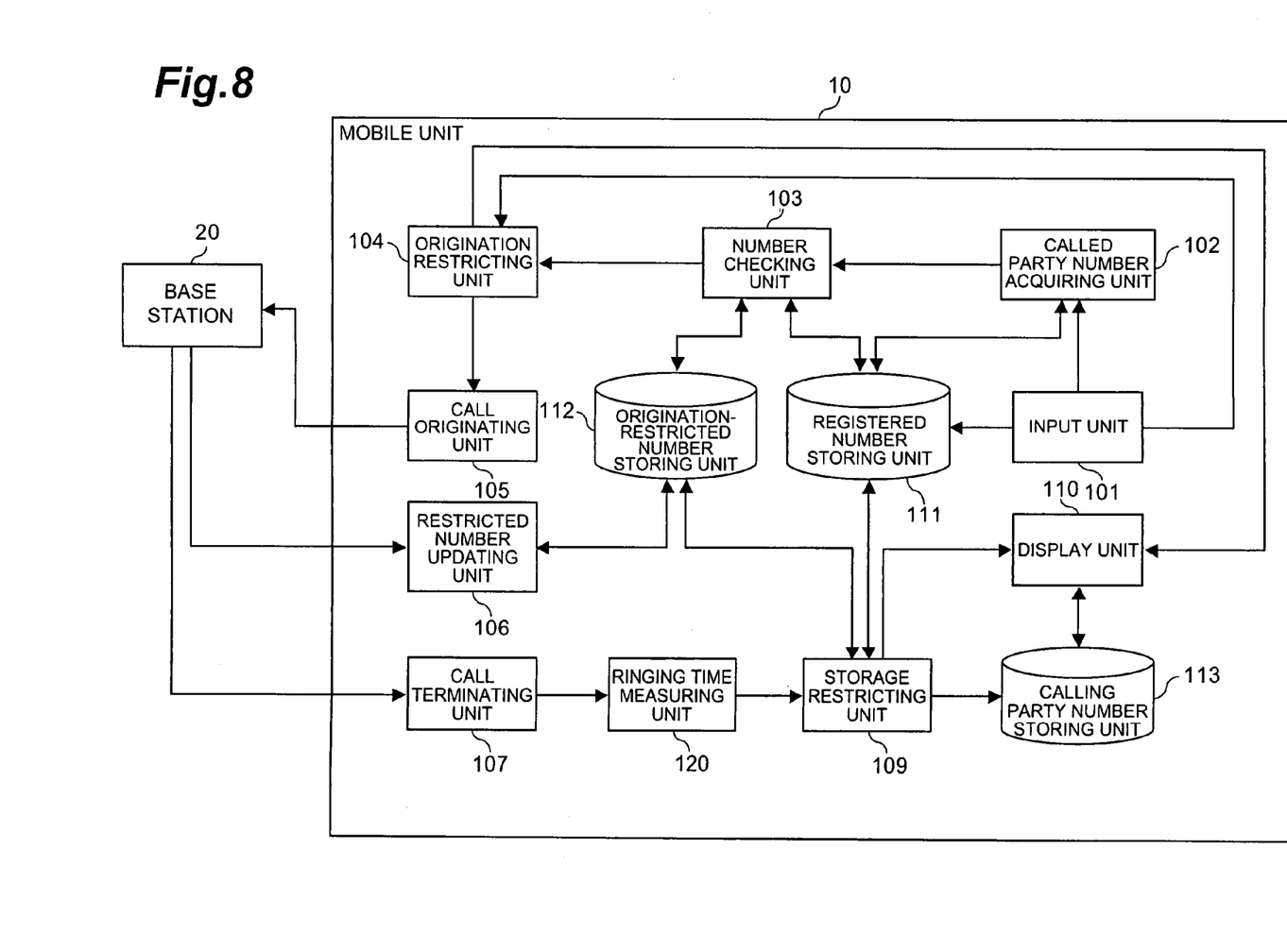
FIG. 8 is a diagram for explaining the mobile unit as an embodiment of the present invention.
Figure 9:
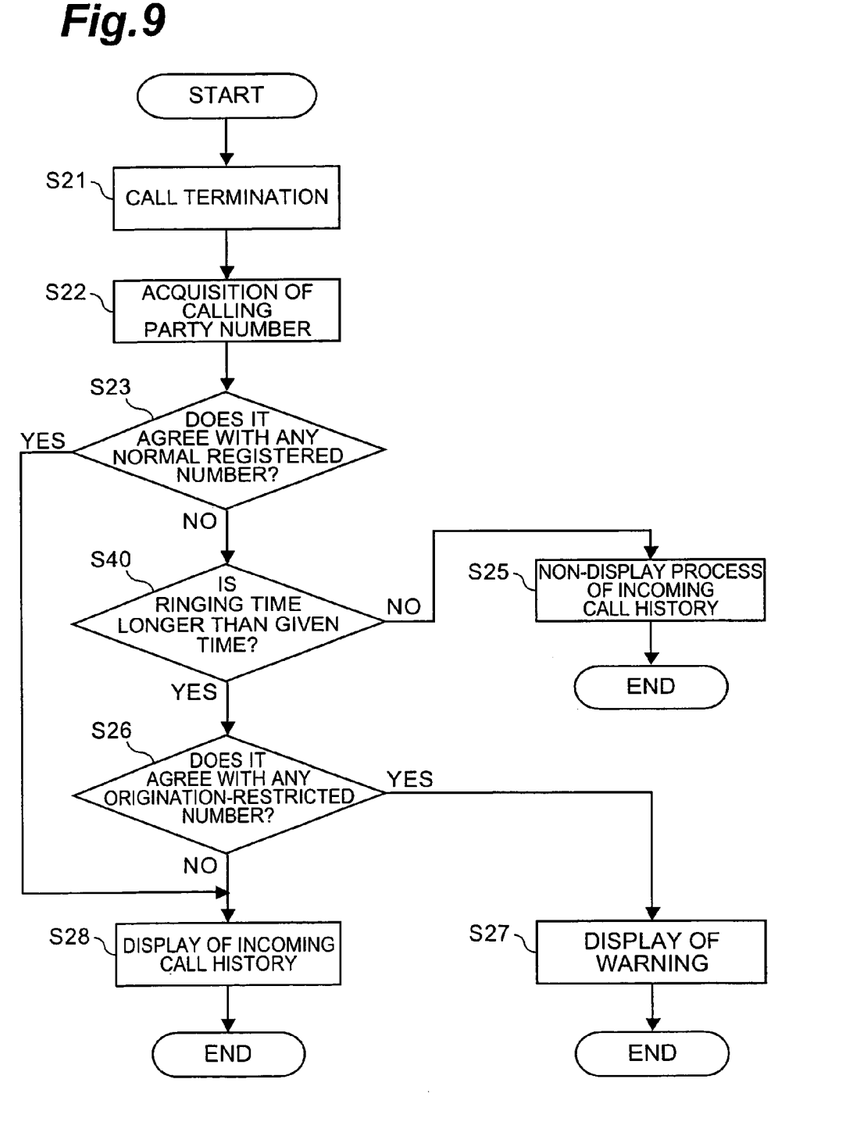
FIG. 9 is a flowchart showing a method of displaying the incoming call history, using the mobile unit as an embodiment of the present invention.

FIG. 8 is a diagram for explaining the mobile unit according to the modification example and FIG. 9 a flowchart showing a method of displaying the call history, using the mobile unit according to the modification example.

The mobile unit 10 of the modification example is different from the mobile unit 10 of the above embodiment in that, as shown in FIG. 8, the mobile unit 10 is provided with a ringing time measuring unit 120 (ringing time measuring means) for measuring a ringing time corresponding to an incoming call and for outputting it with a calling party number to the storage restricting unit 109, instead of the ring counting unit 108 of the mobile unit 10 in the above embodiment.

In this case, the call terminating unit 107 performs a process of acquiring a calling party number transmitted from the base station 20 and outputting a call start and a call end of an incoming call to the ringing time measuring unit 120, in addition to the normal call termination process.

Furthermore, in this case, the storage restricting unit 109 stores a calling party number corresponding to an incoming call in the calling party number storing unit 113 when the ringing time measured by the ringing time measuring unit 120 is longer than a predetermined time, but avoids storing a calling party number corresponding to an incoming call in the calling party number storing unit 113 when the ringing time is not longer than the predetermined time (cf. step S40 in FIG. 9). For example, supposing the predetermined time is set at two seconds, a calling party number corresponding to an incoming call whose ringing time is not longer than two seconds is not stored in the calling party number storing unit 113, but a calling party number corresponding to an incoming call whose ringing time is longer than two seconds is stored in the calling party number storing unit 113.

This configuration also prevents the storage restricting unit 109 from storing a calling party number corresponding to an incoming call whose ringing time is not longer than the predetermined time, in the calling party number storing unit 113, so that it is feasible to reduce such acts that the malicious content providers deliberately leave only their calling party numbers in the incoming call history, for example. In this case, the unit may also be so configured that a number registered in the telephone directory is left in the call history, regardless of its ringing time, and that the ringing time is measured for only unregistered numbers.

In the modification example, the storage controlling unit 109 may also be provided with an additional termination notification controlling function of avoiding outputting a termination notification command to the termination notification unit while the ringing time is not longer than the predetermined time, but outputting the termination notification command to the termination notification unit when the ringing time becomes longer than the predetermined time.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile unit comprising:
called party number storing means for storing a called party number;
calling party number acquiring means for acquiring a calling party number corresponding to an incoming call;
ringing time measuring means for measuring a ringing time of the incoming call;
number checking means for checking a calling party number acquired by the calling party number acquiring means and a called party number stored in the called party number storing means; and
storage restricting means for storing a called party number corresponding to the incoming call in a calling party number storing means when a calling party number acquired by the calling party number acquiring a means corresponds to a called party number stored in the called party number storing means as a result of checking by the number checking means, for storing a calling party number corresponding to the incoming call in calling party number storing means when a calling party number acquired by the calling party number acquiring means does not correspond to a called party number stored in the called party number storing means as a result of checking by the number checking means and the ringing time measured by the ringing time measuring means is longer than a predetermined time as a result of checking by the number checking means, and for avoiding storing the calling party number corresponding to the incoming call in the calling party number storing means when a calling party number acquired by the calling party number acquiring means does not correspond to a called party number stored in the called party number storing means as a result of checking by the number checking means and the ringing time measured by the ringing time measuring means is not longer than the predetermined time.

2. A call termination controlling method comprising:
a calling party number acquiring step wherein calling party number acquiring means acquires a calling party number corresponding to an incoming call;

a ringing time measuring step wherein ringing time measuring means measures a ringing time of the incoming call;

a number checking step wherein number checking means checks a calling party number acquired by the calling party number acquiring means and a called party number stored in a called party number storing means; and a storage restricting step wherein storage restricting means stores a called party number corresponding to the incoming call in calling party number storing means when a calling party number acquired by the calling party number acquiring means corresponds to a called party number stored in the called party number storing means as a result of checking by the number checking means, stores a calling party number corresponding to the incoming call in the calling party number storing means when a calling party number acquired by the calling party number acquiring means does not correspond to a called party number stored in the called party number storing means as a result of checking by the number checking means the ringing time measured by the ringing time measuring means is longer than a predetermined time as a result of checking by the number checking means, and avoids storing the calling party number corresponding to the incoming call in the calling party number storing means when a calling party number acquired by the calling party number acquiring means does not correspond to a called party number stored in the called party number storing means as a result of checking by the number checking means and the ringing time measured by the ringing time measuring means is not longer than the predetermined time.

3. A mobile unit comprising:

a first memory configured to store a called party number;

calling party number acquiring unit configured to acquire a calling party number corresponding to an incoming call;

ringing time measuring unit configured to measure a ringing time of the incoming call;

number checking unit configured to check a calling party number acquired by the calling party number acquiring unit and a called party number stored in the first memory; and storage restricting unit configured to store a called party number corresponding to the incoming call in a second memory when a calling party number acquired by the calling party number acquiring unit corresponds to a called party number stored in the first memory as a result of checking by the number checking unit, store a calling party number corresponding to the incoming call in the second memory when a calling party number acquired by the calling party number acquiring unit does not correspond to a called party number stored in the first memory as a result of checking by the number checking unit and the ringing time measured by the ringing time measuring unit is longer than a predetermined time as a result of checking by the number checking unit, and not store the calling party number corresponding to the incoming call in the second memory when a calling party number acquired by the calling party number acquiring unit does not correspond to a called party number stored in the first memory as a result of checking by the number checking unit and the ringing time measured by the ringing time measuring unit is not longer than the predetermined time.

* * * * *